(12) United States Patent  (10) Patent No.: US 8,430,414 B1
Yap  (45) Date of Patent: Apr. 30, 2013

(54) FOLDING BICYCLE ASSEMBLY

(76) Inventor: Fook Fah Yap, Singapore (SG)

( * ) Notice: Subject to any disclaimer, the term of this patent is extended or adjusted under 35 U.S.C. 154(b) by 0 days.

(21) Appl. No.: 13/439,254

(22) Filed: Apr. 4, 2012

Related U.S. Application Data

(60) Provisional application No. 61/581,409, filed on Dec. 29, 2011.

(51) Int. Cl.
  *B62K 15/00* (2006.01)
(52) U.S. Cl.
  USPC ........................................................... 280/278
(58) Field of Classification Search .................. 280/278, 280/287
  See application file for complete search history.

(56) References Cited

U.S. PATENT DOCUMENTS

| | | | | |
|---|---|---|---|---|
| 5,836,602 | A * | 11/1998 | Wang | 280/287 |
| 5,936,602 | A * | 8/1999 | Tsuchida et al. | 345/99 |
| 6,364,335 | B1 * | 4/2002 | Mombelli | 280/287 |
| 6,799,771 | B2 * | 10/2004 | Bigot | 280/278 |
| 2007/0210556 | A1 | 9/2007 | Hon | |

FOREIGN PATENT DOCUMENTS

EP  0026800 B1  5/1984

OTHER PUBLICATIONS

Riese and Muller Frog, A to B, Apr. 2010, pp. 18-21, Issue 77, United Kingdom.

* cited by examiner

*Primary Examiner* — Tony Winner
(74) *Attorney, Agent, or Firm* — Sinorica, LLC

(57) ABSTRACT

The folding bicycle can easily change between a riding position and a folded position for storage and transportation. The folding bicycle comprises a rear wheel assembly, a central frame assembly, a steering assembly, a seat assembly, a plurality of hinge couplings, and a plurality of quick-release clamps. The hinge couplings allow the bike to fold in thirds. The quick-release clamps allow various parts to easily move when desired, such as sliding the seat assembly down or detaching the rear wheel assembly from the central frame assembly. In a riding position the folding bicycle functions as a normal bicycle. The folding bicycle can be converted to the folded position by using the hinge couplings and quick-release clamps to fold the rear wheel assembly and the steering assembly adjacent to the central frame assembly, fold part of the steering assembly down, and sliding the seat assembly down into the central frame assembly.

19 Claims, 23 Drawing Sheets

View A

FOLDING BICYCLE ASSEMBLY

The current application claims a priority to the U.S. Provisional Patent application Ser. No. 61/581,409 filed on Dec. 29, 2011.

FIELD OF THE INVENTION

The present invention relates generally to an apparatus for transportation. More specifically, the apparatus is a folding bicycle that can be quickly folded into a compact configuration for storage and carrying in limited space areas.

BACKGROUND OF THE INVENTION

For a cyclist who lives in a crowded world where space is at a premium at home and in the workplace, storing a bicycle could present a challenge because of its size. For the same reason, it is often not practical to carry a conventional bicycle on buses, trains, taxis, small boats, and planes, thus limiting its use for the commuting or touring cyclist. Many existing folding bikes are either not full-size bicycles, use very small wheels that compromise stability and comfort, fold into a cumbersome package, or require the use of special components in order to reduce the folded size.

A common folding bicycle design (e.g. Dahon) comprises a single hinge joint on its frame, by which a front half of a bicycle may be folded laterally to meet a rear half, as shown in FIG. 1. Such a folding design with a single frame joint effectively reduces the length of the bicycle by about half when folded. However, the folded bicycle is still too large and cumbersome to carry or store.

In order to reduce the length of the folded bicycle, a second hinge on a frame can be used. This effectively reduces the length to approximately one-third when folded. In another common folding bicycle design (e.g. Brompton), a second hinge joint is located between a rear triangle and a main frame, proximal to the bottom of a seat tube, as shown in FIG. 2 and FIG. 3. The second hinge axis is lateral in orientation, parallel to a wheel axle and transverse to the first hinge. Pivoting a rear wheel assembly longitudinally through approximately 180 degrees about the second hinge brings the rear end of the bicycle to rest below a main tube of a central part of the frame. Pivoting a front wheel assembly laterally about the first hinge through approximately 180 degrees brings the front end of the bicycle to rest alongside the central part of the frame.

A disadvantage of both the aforementioned designs is the predominantly vertical orientation of the axis of the first frame hinge. Natural forces at play during normal riding tend to put much bending stress on the main frame hinge and to unfasten the hinge. Thus a strong clamping means must be used to keep the hinges closed. Over time, the hinge may also develop play in the joint due to the high bending forces on the spindle. Another disadvantage is that folding requires effort to move the front wheel assembly sideways about the first hinge, transversely through a wide angle of approximately 180 degrees. This is a rather unwieldy operation and compromises folding and unfolding time.

Some folding bicycle designs (e.g. Birdy, Mezzo) have tried to overcome the aforesaid problems by doing away with the main frame hinge, and instead use a pivot means at the front fork to fold the front wheel. However, without a hinge on the main frame, the length of the folded bike is longer unless smaller wheels and/or a short main frame are used. Yet a further disadvantage of the above-mentioned designs is that the bicycle cannot be rolled on the ground once it has been fully folded, unless special rollers are fitted, thus adding to the complexity of the design.

It is therefore an object of the present invention to introduce a full-size folding bicycle that can be quickly folded into a compact package for storage in tight spaces and can be readily transported on buses, trains, cars, and boats without compromising stability and comfort.

SUMMARY OF THE INVENTION

The present invention is a folding bicycle that can be quickly folded into a compact package for storage in tight spaces and can be readily transported on buses, trains, cars, and boats. The preferred embodiment of the present invention is a folding bicycle which fits an adult like a full-size conventional bicycle. The present invention has geometry and wheel size that do not compromise stability and comfort. The present invention can be fitted with a wide range of drive system components thus allowing for good riding speed when in use. The present invention can be quickly folded into a package smaller than many existing folding bicycles.

The preferred embodiment of the present invention can be folded at two spots on a frame and can be folded into a compact volume with length about one-third of a full size bicycle, a height only slightly greater than the diameter of a wheel, and a width less than the combined width of the two wheels. Unlike existing folding bicycle designs with two folding points, the present invention folds both front and rear assemblies along predominantly vertical and parallel planes toward a central frame. The present invention allows for a simpler folding process, needs less effort as it is assisted by gravity, and is more intuitive and quicker to execute than existing dual-frame hinge designs that require a transverse fold as well as a longitudinal fold. Further, the frame hinges naturally stay shut under the weight of the bicycle and a rider during normal use. The fully folded bicycle may also be rolled on its front wheel.

It should be appreciated that the folding method of the present invention cannot be achieved by simply using a pair of hinges with transverse axes because of interference between the front and rear assemblies as they fold to meet at the center. To avoid the interference, the obvious solution is to skew the hinge axes in opposite directions from the longitudinal plane. However, this will not work well because it will necessitate large skew angles, resulting in a folded package with a large width. The following will describe a novel solution to this problem.

DETAILED DESCRIPTION OF THE INVENTION

All illustrations of the drawings are for the purpose of describing selected versions of the present invention and are not intended to limit the scope of the present invention.

Figure 1:
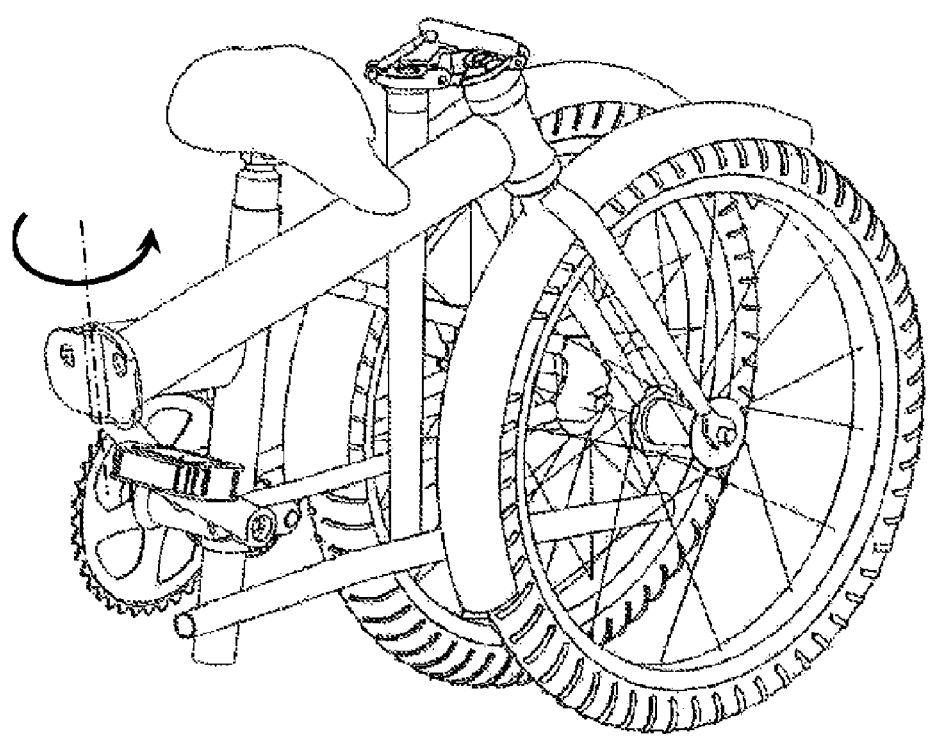
FIG. 1 is a perspective illustration of a first prior art in a folded configuration.
Figure 2:
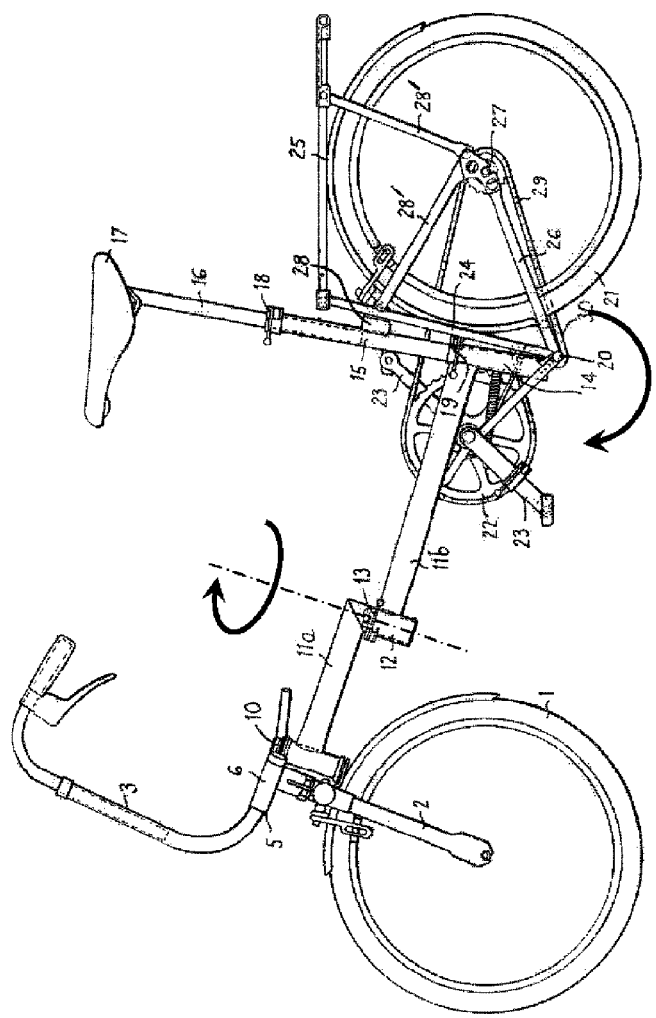
FIG. 2 is a left-side illustration of a second prior art.
Figure 3:
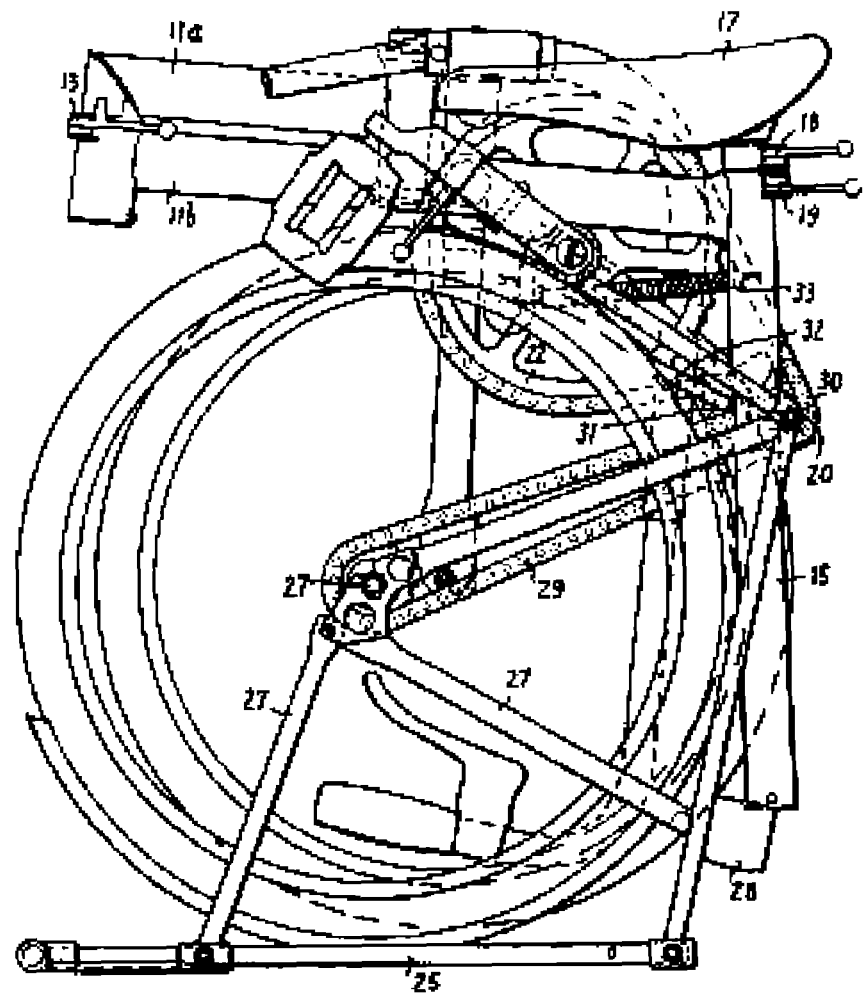
FIG. 3 is a left-side illustration of the second prior art in a folded configuration.
Figure 4:
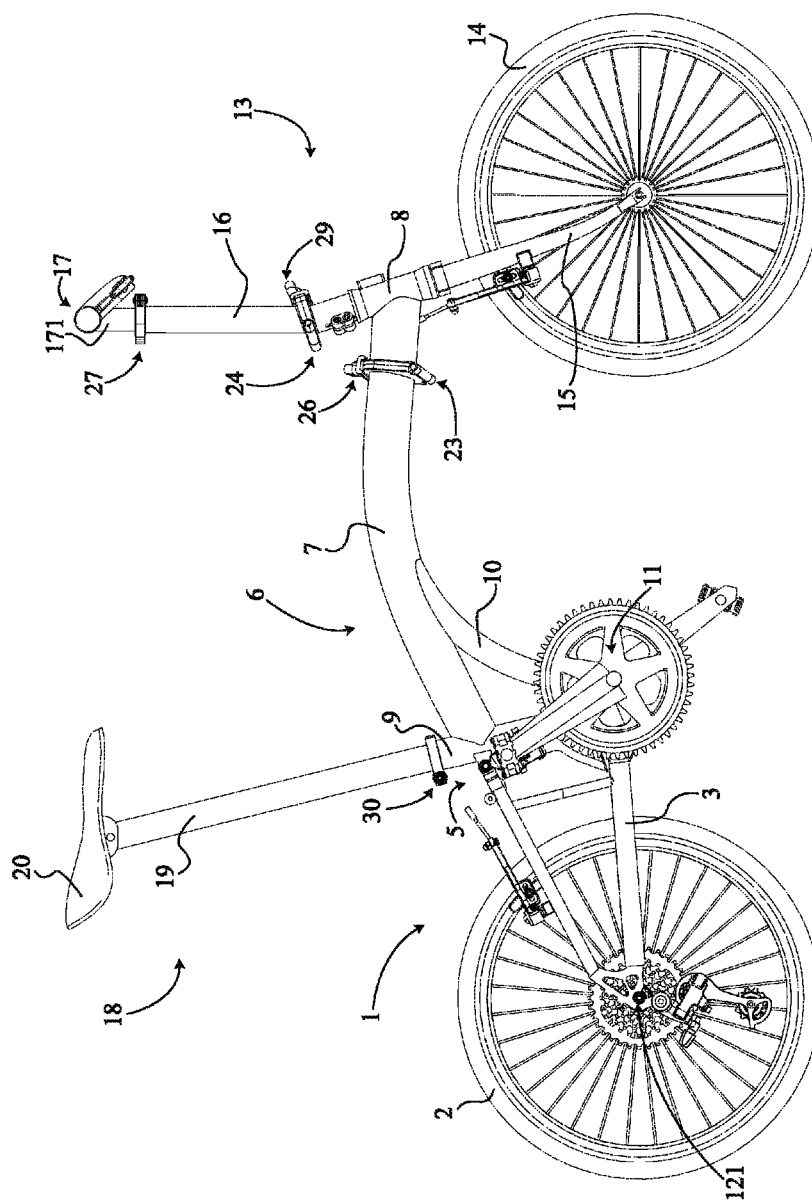
FIG. 4 is a right-side elevation illustration of the preferred embodiment of the present invention.

As can be seen in FIG. 4, the present invention comprises a rear wheel assembly 1, a central frame assembly 6, a steering assembly 13, a seat assembly 18, hinges, and quick-release clamps. The rear wheel assembly 1 is connected to the central frame assembly 6 at two points, and is capable of detaching at one point and pivoting at the other point. Connected to the other end of the central frame assembly 6 is the steering assembly 13, which is capable of being steered. The seat assembly 18 is connected to the central frame assembly 6 near the rear wheel assembly 1. Hinge couplings and quick-release clamps enable the bike to be folded at several locations, and locking mechanisms may be provided to secure the hinge couplings and quick-release clamps in the riding and folded positions. In other embodiments, the quick-release clamps can be any quick-release mechanism that allows a user to lock a part into place.

Figure 20:
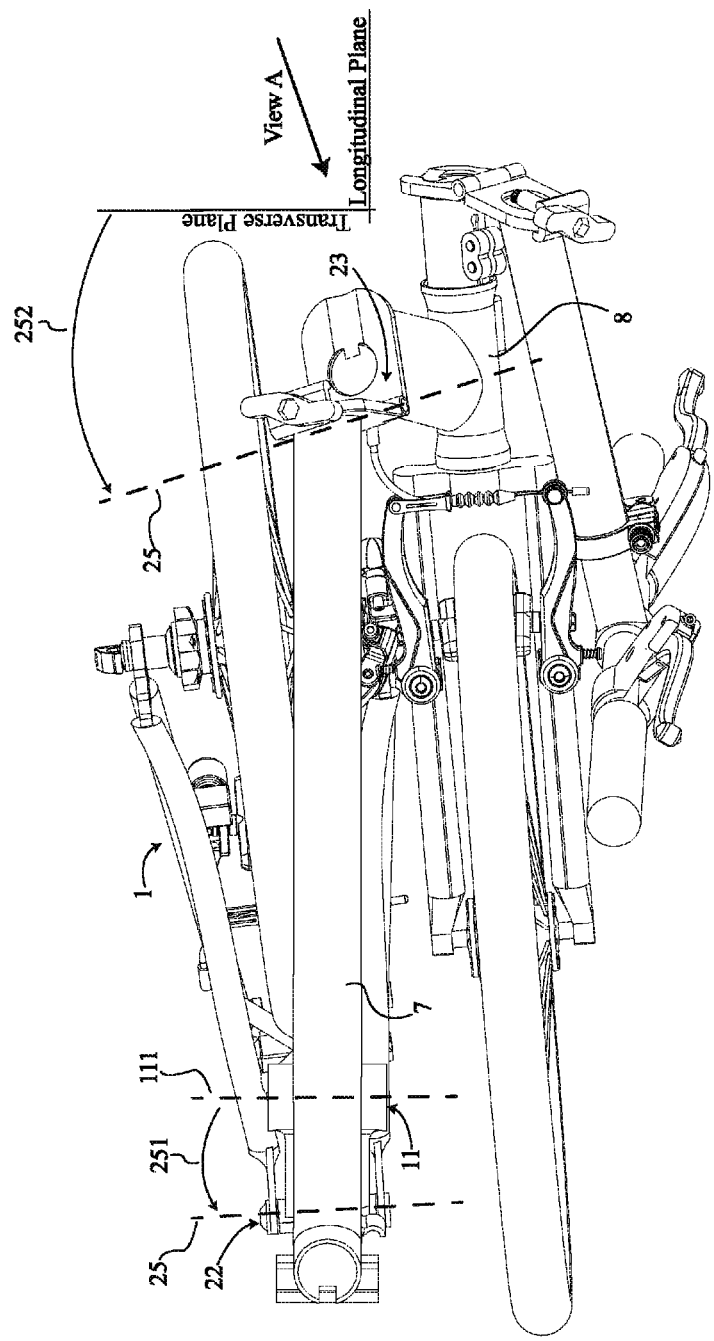
FIG. 20 is a top-side illustration of the preferred embodiment of the present invention showing the angles of two of the hinge axes.

The rear wheel assembly 1 comprises a rear wheel 2, a wheel carrier 3, and a rear frame latch 5. In the present invention the wheel carrier 3 has a triangular shape, with the points being a pivoting end, the rear frame latch 5, and a hub or axle end. The wheel carrier 3 has two identical sides, which are located on each side of the rear wheel 2. The rear wheel 2 is rotatably connected to the wheel carrier 3 at a hub of the wheel by way of a rear wheel axle 121 associated with the hub. The rear wheel 2 and its axle 121 are connected within the two sides of the wheel carrier 3 at the axle 121 end, with the axle axis traversing perpendicularly through the wheel carrier. The wheel carrier 3, which can be formed of a hollow metal body, is connected by a rear frame hinge 22 to the central frame assembly 6 at a pivot end, proximal to the lower end of the seat tube 9. The rear frame hinge 22 allows the rear wheel assembly to pivot about a hinge axis 25 of the rear frame hinge 22. The hinge axis 25 of the rear frame hinge 22 traverses the pivot end of the rear wheel assembly 1. As can be seen in FIG. 20, the hinge axis 25 is offset at a first acute angle 251 of approximately 5 degrees measured counter-clockwise from a bottom bracket axis 111, transverse to the main frame member, of a bottom bracket 11. The wheel carrier 3 is detachably coupled by a seat stays clamp 28 to the central frame assembly 6 at the rear frame latch 5, proximal to the upper end of the seat tube 9. Unfastening the seat stays clamp 28 disengages the rear frame latch and allows the rear wheel assembly 1 to be pivoted between an operative riding position disposed at the rearward end of the bicycle and a compact folded position alongside the central frame assembly 6. The motion of any point on the rear wheel assembly 1 about the hinge axis 25 of the rear frame hinge 22 (at the pivot end) lies in a plane which is substantially vertical and inclined to the vertical longitudinal plane of the bicycle in its operative riding position at approximately 5 degrees counter-clockwise (as seen from the top). The slightly skewed pivot plane relative to the bicycle longitudinal plane effectively causes the rear wheel 2 to move to one side of the main frame member 7 as it is pivoted through approximately 180 degrees from the unfolded position to the folded position. The first acute angle 251 of the hinge axis 25 and the angular pivot range of the rear wheel assembly 1 may be greater or lesser than aforesaid, depending on the width dimensions of the various parts of the bicycle and its specific geometry.

Figure 9:
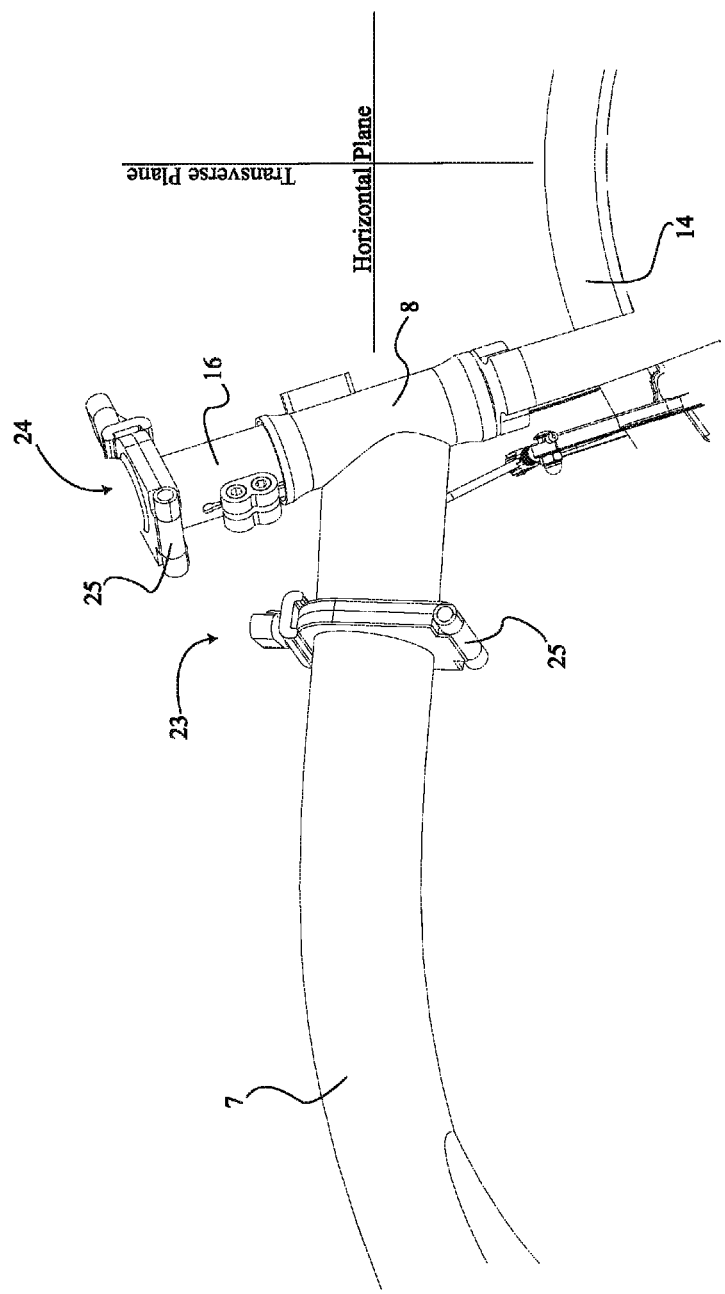
FIG. 9 is a right-side illustration of a frame hinge and showing its position relative to a main frame member and a head tube of the preferred embodiment of the present invention.
Figure 10:
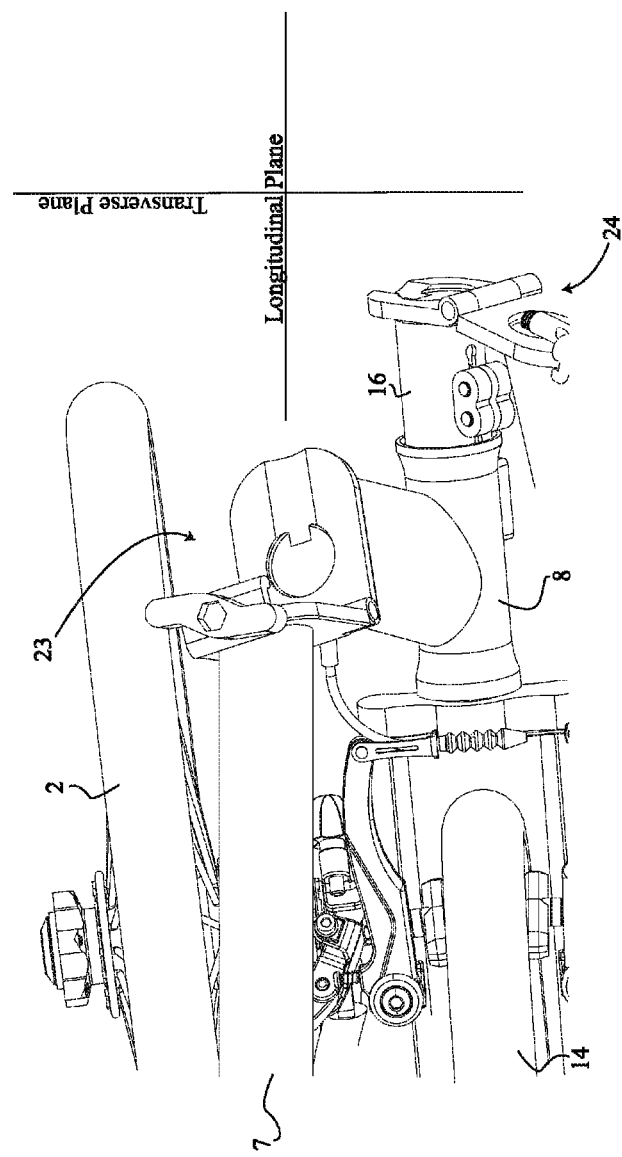
FIG. 10 is a top-side illustration of the frame hinge as seen from the top and showing an orientation of a hinge axis to a longitudinal plane and a transverse plane of the preferred embodiment of the present invention.
Figure 11:
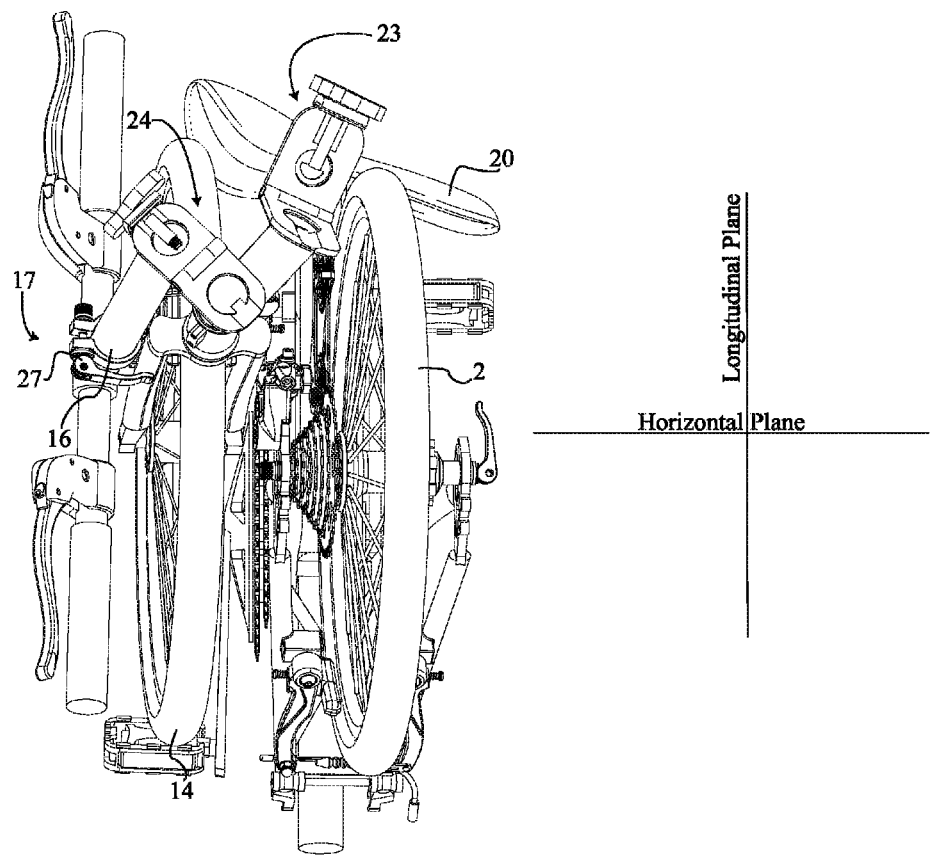
FIG. 11 is a front-side illustration of the frame hinge as seen from the front and showing an orientation of the hinge axis to the longitudinal plane and a horizontal plane of the preferred embodiment of the present invention.
Figure 21:
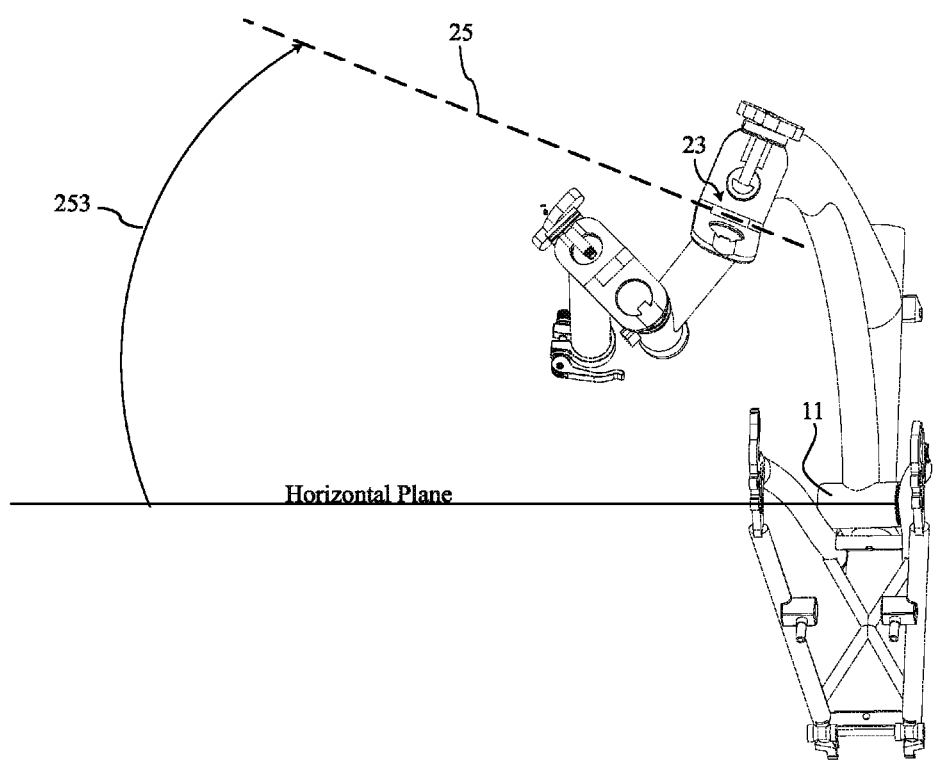
FIG. 21 is an illustration (from View A labeled in FIG. 20) of the preferred embodiment of the present invention showing a true view of the main frame hinge and the angle it makes with the horizontal plane.

The central frame assembly 6, which can be formed of a hollow metal body, comprises a main frame member 7, a head tube 8, a seat tube 9, a down tube 10, a bottom bracket 11, and a crank set. The main frame member 7 extends in the fore and aft direction of the bicycle, from the head tube 8 to the seat tube 9. The main frame member 7 is joined at its rearward end to the seat tube 9. The seat tube 9 is hollow and open at both ends, such that it may receive a seat post 19 inserted into it from the top end. The seat tube 9 extends down between the rearward end of the main frame member 7 and the rearward side of the bottom bracket 11. The down tube 10 extends downward and rearward from part way along the length of the main frame member 7 towards the bottom bracket 11. The bottom bracket 11 carries a crank set which forms part of the bicycle drive system. The head tube 8 and seat tube 9 are slightly slanted relative to the vertical in the unfolded configuration. The main frame member 7 is joined at its forward end to the head tube 8. The head tube 8 is hollow and open at both ends. The main frame hinge 23 is located on the main frame member 7, close to the head tube 8 but with a space between the head tube 8 and main frame hinge 23. The main frame hinge 23 has a main frame clamp 26 located opposite the hinge axis 25 which secures the main frame hinge 23 when the present invention is in the riding position. The main frame hinge 23 pivotally connects the main frame member 7 and the head tube 8. The hinge axis 25 of the main frame hinge 23 is disposed at such a position and orientation relative to the head tube 8 that when in the riding position the front wheel 14 is disposed forwardly of the main frame and lying substantially in the bicycle longitudinal plane, and when in the folded position the front wheel 14 is to one side of the main frame member 7 in a plane inclined relative to the longitudinal plane. The hinge axis 25 of the main frame hinge 23 is located on the underside of the main frame member 7 (as shown in FIG. 9), and oriented such that it is firstly inclined relative to a transverse horizontal axis at a second acute angle 252 of approximately 15 degrees counter-clockwise (as shown in FIG. 20), and secondly inclined relative to a horizontal plane at a third acute angle 253 of approximately 20 degrees clockwise (as shown in FIG. 21). This should be sufficient for the front wheel 14 to be able to lie alongside the central frame assembly 6 by the time the front wheel 14 has pivoted from the riding position of the assembly to its folded position. Greater or lesser angles of inclination of the hinge axis 25 of the main frame hinge 23 may be appropriate depending on the width dimensions of the various parts of the bicycle and its specific geometry. The angular range of travel of the steering assembly 13 between the use position and the folded position may also depend on specific geometrical aspects, but is typically about 90 degrees. The main frame member 7 can be slightly curved but is primarily horizontal in orientation or slightly slanted relative to the horizontal plane when in the riding position.

Figure 6:
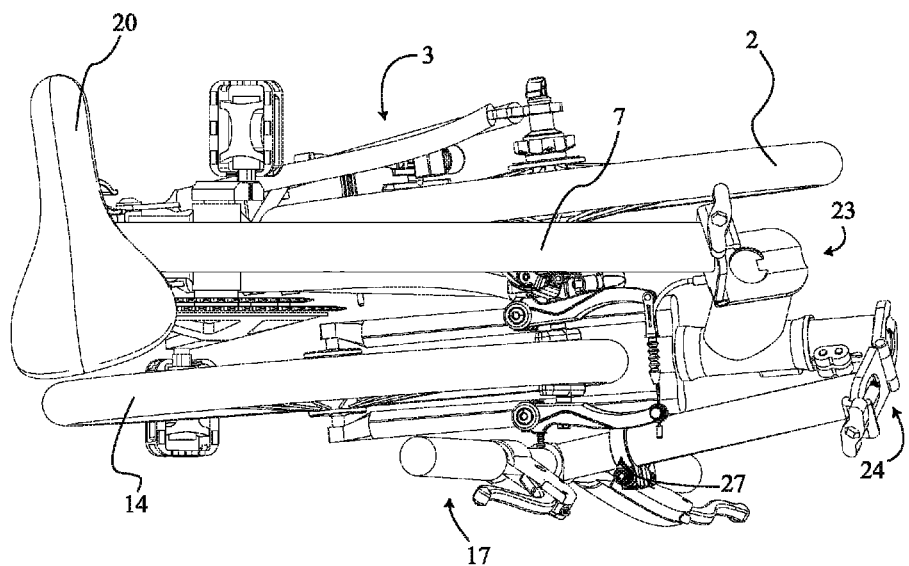
FIG. 6 is a top-side illustration of the preferred embodiment of the present invention in a folded configuration.
Figure 7:
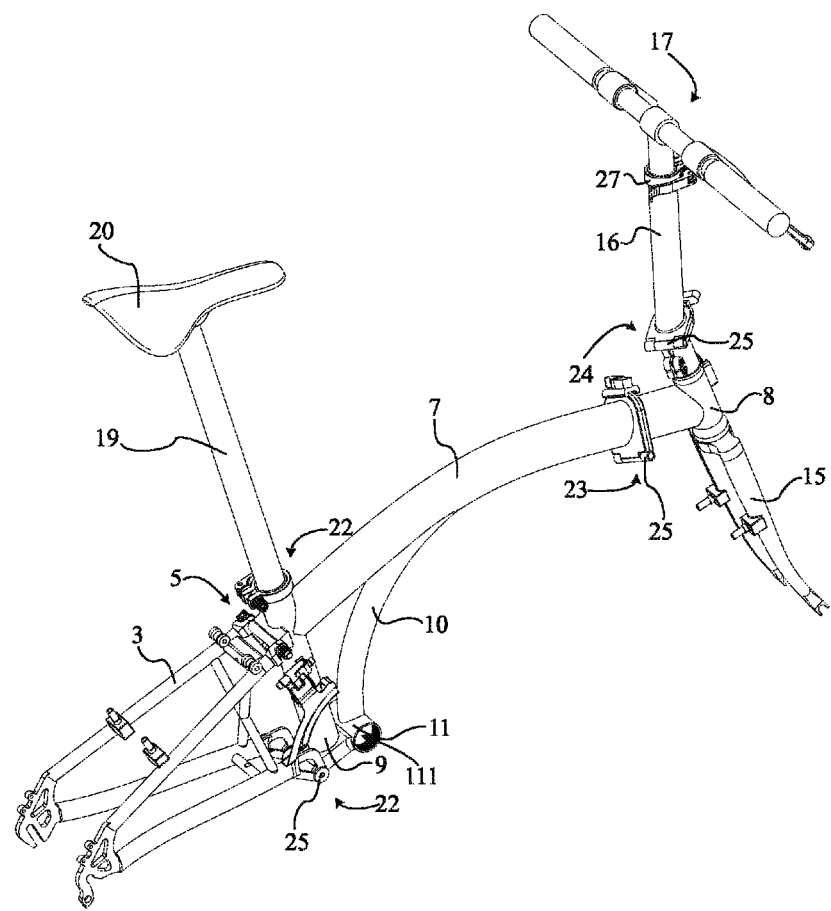
FIG. 7 is a right-side perspective illustration of the preferred embodiment of the present invention without wheels and drive system components.
Figure 22:
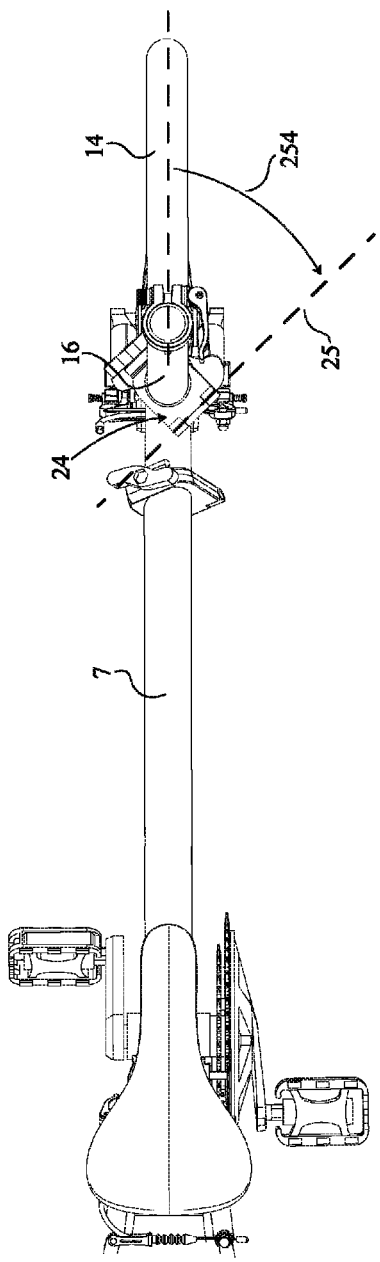
FIG. 22 is a top-side illustration of the preferred embodiment of the present invention showing the angle at which a third assembly folds.
Figure 23:
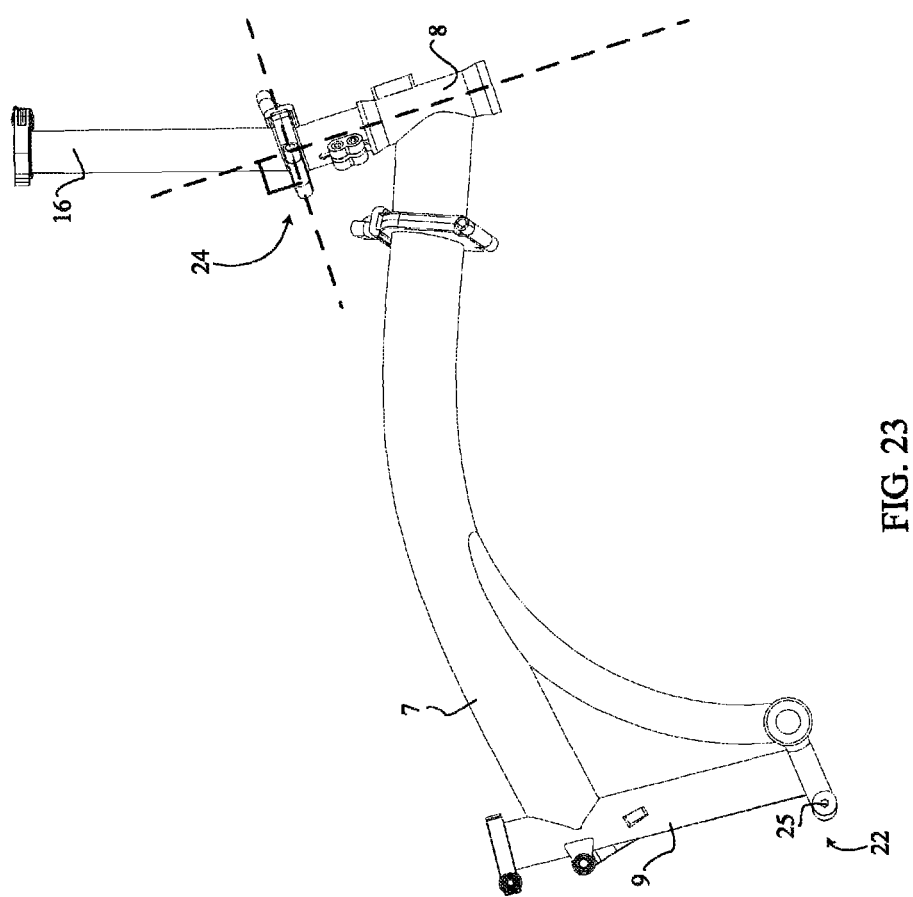
FIG. 23 is a right-side illustration of the preferred embodiment of the present invention showing the angle at which a third assembly folds.

The steering assembly 13 comprises a front wheel 14, a fork 15, a steering tube 16, a handlebar 17, and a handlebar stem 171. The front wheel 14 is connected to the fork 15 at a hub of the wheel by way of an axle associated with the hub. The fork 15 has a crown which connects to the steering tube. Attached to the crown there are two fork legs which extend in a direction opposite the steering tube and terminate at an axle end. The front wheel 14 and its axle are within the two fork legs, with the axle being connected to the axle end of each leg. The fork 15 extends down from the head tube 8, towards the ground. The handlebar stem 171 connects to the steering tube 16. Perpendicularly attached to the handlebar stem 171 is the handlebar 17. A handlebar clamp 27 locks the handlebar stem 171 in place. The handlebar clamp 27 is located on the steering tube 16, adjacent to the handlebar stem 171. The handlebar clamp 27 can be loosened to adjust the height of the handlebar 17 by moving the handlebar stem 171 up or down through the steering tube 16. Once the desired height is reached the handlebar clamp 27 can be tightened. The steering tube 16 is rotatably coupled with the head tube 8, which allows the steering assembly 13 to be rotated about the axis of the head tube 8. When the head tube 8 is pivoted about the main frame hinge 23, the steering assembly 13 is carried along by the head tube 8 while maintaining a degree of freedom in the rotary coupling to rotate relative to the head tube 8. The steering tube 16 carries the handlebar 17 at its upper end. From the reference of the operative riding configuration, the handlebar 17 is primarily horizontal and symmetrically disposed in relation to the bicycle longitudinal plane. A steering tube hinge 24 is located at the lower end of the steering tube 16. The steering tube hinge 24 has a steering tube clamp 29 located opposite the hinge axis 25 which secures the steering tube hinge 24 when the present invention is in the riding position. As seen in FIG. 22 and FIG. 23, the hinge axis 25 of the steering tube hinge 24 is at a fourth acute angle 254 measured clockwise from the plane of the front wheel 14 and a perpendicular angle measured from the axis of the head tube 8. This allows the steering tube 16 and handlebar 17 to pivot downward to a position that lies alongside the fork 15 and the front wheel 14. The main frame hinge 23 connecting the main frame member 7 with the head tube 8 allows the steering assembly 13 to be pivoted about the hinge axis 25 of the main frame hinge 23 through approximately 90 degrees to its folded position by movement downward, then upward and backward. During this movement of the steering assembly 13 the inclined hinge axis 25 of the main frame hinge 23 and its spacing from the head tube 8 have the effect that the assembly also progressively moves to one side of the vertical longitudinal plane of the bicycle so that by the time it has reached its folded position, the fork 15 lies generally beside the central frame assembly 6. Turning the steering tube 16 slightly about the axis of the head tube 8 allows the front wheel 14 to be brought to lie alongside the central frame assembly 6 in a plane inclined relative to the vertical longitudinal plane, such that the plane of the front wheel 14 is approximately parallel to the plane of the folded rear wheel 2, but lying on the other side of the main frame, as shown in FIG. 6. In the folded position the steering assembly 13 lies alongside the fork 15 and front wheel 14.

The seat assembly 18 comprises a seat post 19 and a seat 20. The seat post 19 holds the seat 20 at the top end. In the riding configuration the seat post 19 is partially inserted into the seat tube 9 of the central frame assembly 6 and is held in place by the use of a seat post clamp 30. To reduce the height of the rear part of the bicycle the seat post 19 is slidably engaged with the seat tube 9 and can be retracted or extended relative to the seat tube 9 when the seat post clamp 30 is loosened. The seat 20 can also be rotated to an orientation perpendicular to the length of the bicycle.

In addition to the mentioned components, the present invention may also comprise a handle and a stand. The handle would allow a person to carry the bicycle when it is in the folded position. The stand would allow the bicycle to be kept upright when in the folded position.

Figure 5:
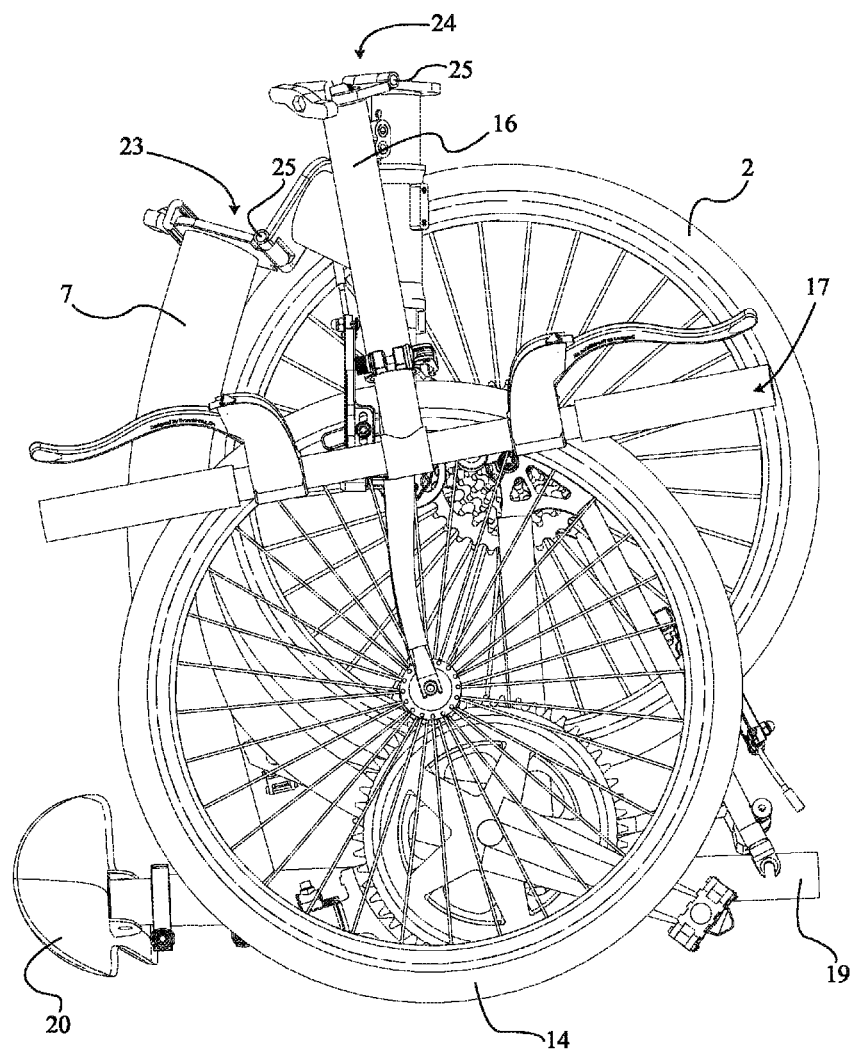
FIG. 5 is a right-side elevation illustration of the preferred embodiment of the present invention in a folded configuration suitable for rolling on a wheel.

The present invention functions as follows. As can be seen in FIG. 4, the present invention is arranged such that, when the present invention is in the operative riding position (symmetrically disposed in relation to a vertical longitudinal plane), the present invention has normal dimensions that will fit adult riders in a similar way to conventional non-folding bicycles. When the present invention is in a completely folded position (FIG. 5), the rear wheel 2 (carried by the wheel carrier 3 in the rear wheel assembly 1) and the front wheel 14 (carried by the fork 15 in the steering assembly 13) are substantially alongside one another, one on each side of the central frame assembly 6. Further, with the seat post 19 retracted into the seat tube 9 of the central frame assembly 6, and the steering tube 16 and handlebar 17 folded to lie alongside the fork 15 and front wheel 14, the entire bicycle is reduced to compact dimensions in the folded position, as shown in FIG. 5 and FIG. 6. The folded bicycle forms a compact package suitable for transport, carrying by the user, and storage.

Figure 13:
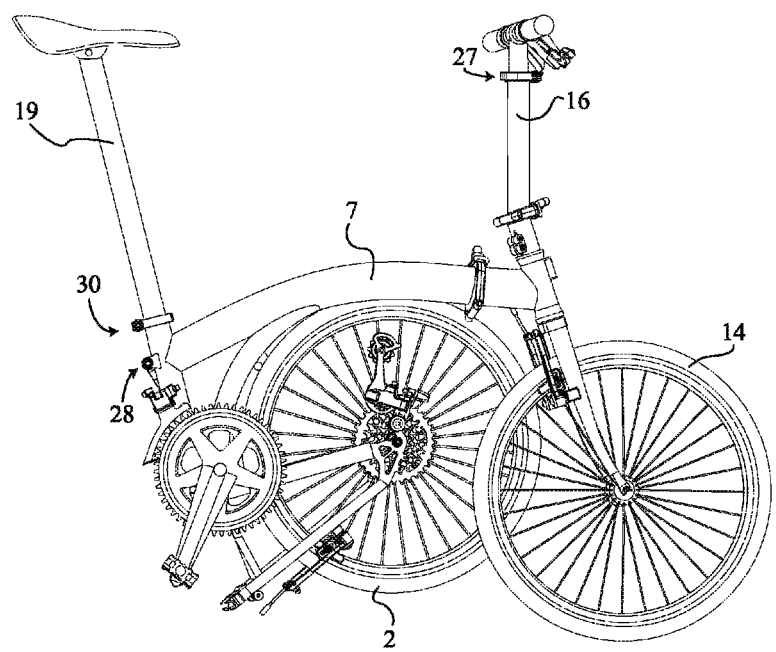
FIG. 13 is a right-side illustration showing the rear wheel assembly in the folded position of the preferred embodiment of the present invention.
Figure 15:
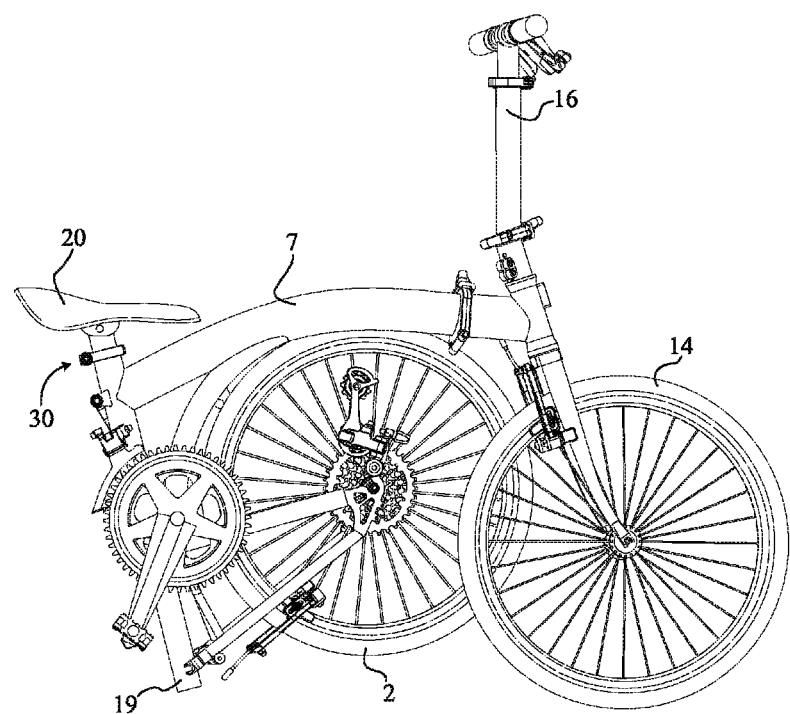
FIG. 15 is a right-side illustration of the preferred embodiment of the present invention showing a seat post in a retracted position.

From a side view of the bicycle, the rear wheel assembly 1 is disposed rearward of the central frame assembly 6 in a riding position (FIG. 4), and lies partly alongside the main frame member 7 when in a folded position (FIG. 5). From a top view of the bicycle, the pivot plane of the rear wheel assembly 1 during folding is inclined at a small angle to the bicycle vertical plane, such that the rear wheel 2 can swing progressively out of the bicycle vertical longitudinal plane to lie generally along one side of the main frame member 7. The relative inclination of the two planes is sufficient for the rear wheel 2 to move far enough to the side of the main frame to be able to overlap the main frame member 7 in a side view of the bicycle, as shown in FIG. 13, and to avoid interference of the components of the rear wheel assembly 1 with the components of the steering assembly 13 in the folded state (shown in FIG. 5 and FIG. 6). From a side view of the seat assembly 18, the seat 20 height is progressively lowered as the seat post 19 is retracted into the seat tube 9 from a riding position to a folded position, such that the seat 20 may be located proximal to the main frame member 7, as shown in FIG. 15. When the seat assembly 18 is fully retracted into the seat tube 9, the seat post 19 extends out from the bottom end of the seat tube 9. From a side view, the part of the seat post 19 that extends out from the lower end of the seat tube 9 is disposed in a region partially occupied by the wheel carrier 3 and the rear drive system, but does not interfere with them.

The main frame hinge 23 on the main frame member 7 is arranged such that the steering assembly 13 progressively moves to one side of the main frame member 7 when it pivots. Thus, when the steering assembly 13 is in the folded position, the front wheel 14 is located completely alongside the central frame assembly 6, as shown in FIG. 5 and FIG. 6. From a side elevation view of the bicycle, the fork 15 in the folded configuration is rotated by approximately 90 degrees from the riding position.

Figure 16:
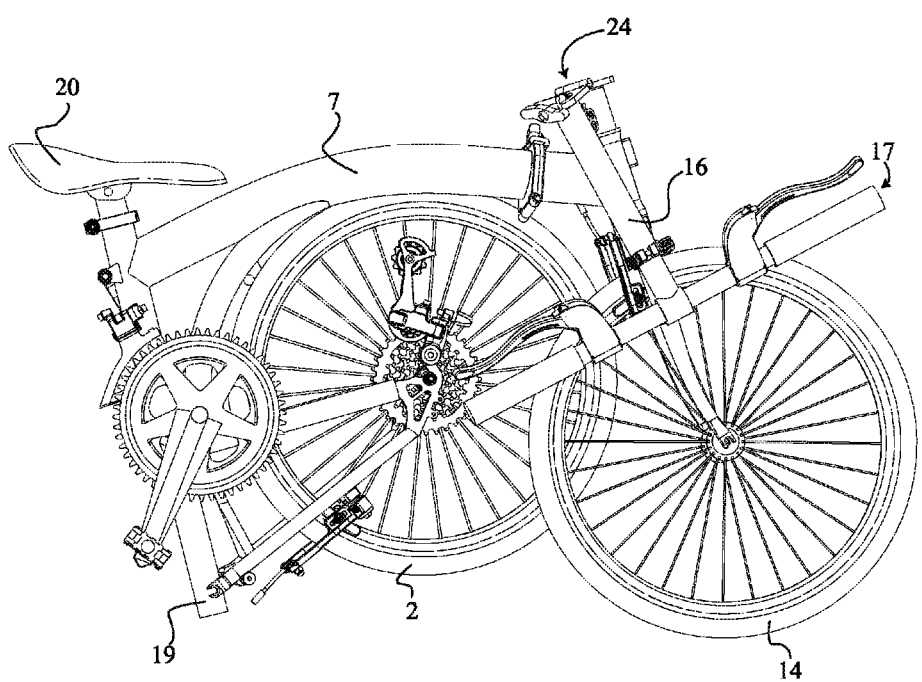
FIG. 16 is a right-side illustration of the preferred embodiment of the present invention showing a steering tube and a handlebar in a folded position.
Figure 17:
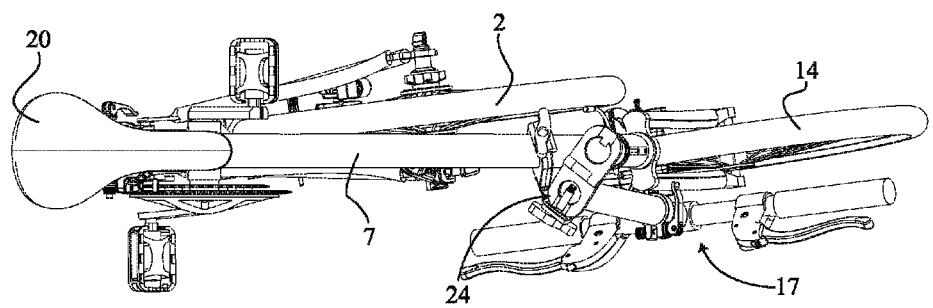
FIG. 17 is an alternative top-side illustration of the preferred embodiment of the present invention showing a steering tube and a handlebar in a folded position.

It will be appreciated that if the main frame hinge 23 on the main frame member 7 is unlocked and if the main frame member 7 is lifted vertically off the ground then the whole steering assembly 13 will start to pivot substantially downward about said main frame hinge 23. In use, said main frame hinge 23 is locked and the combined effect of the weight of the bicycle and a rider will keep the main frame hinge 23 closed, as if the main frame member 7 is rigid as in a conventional bicycle. The steering tube hinge 24 on the steering tube 16 enables the steering tube 16 and handlebar 17 to be folded to lie alongside the fork 15 and the front wheel 14, as shown in FIG. 16 and FIG. 17.

Instructions for folding and unfolding the present invention are as follows.

Figure 8:
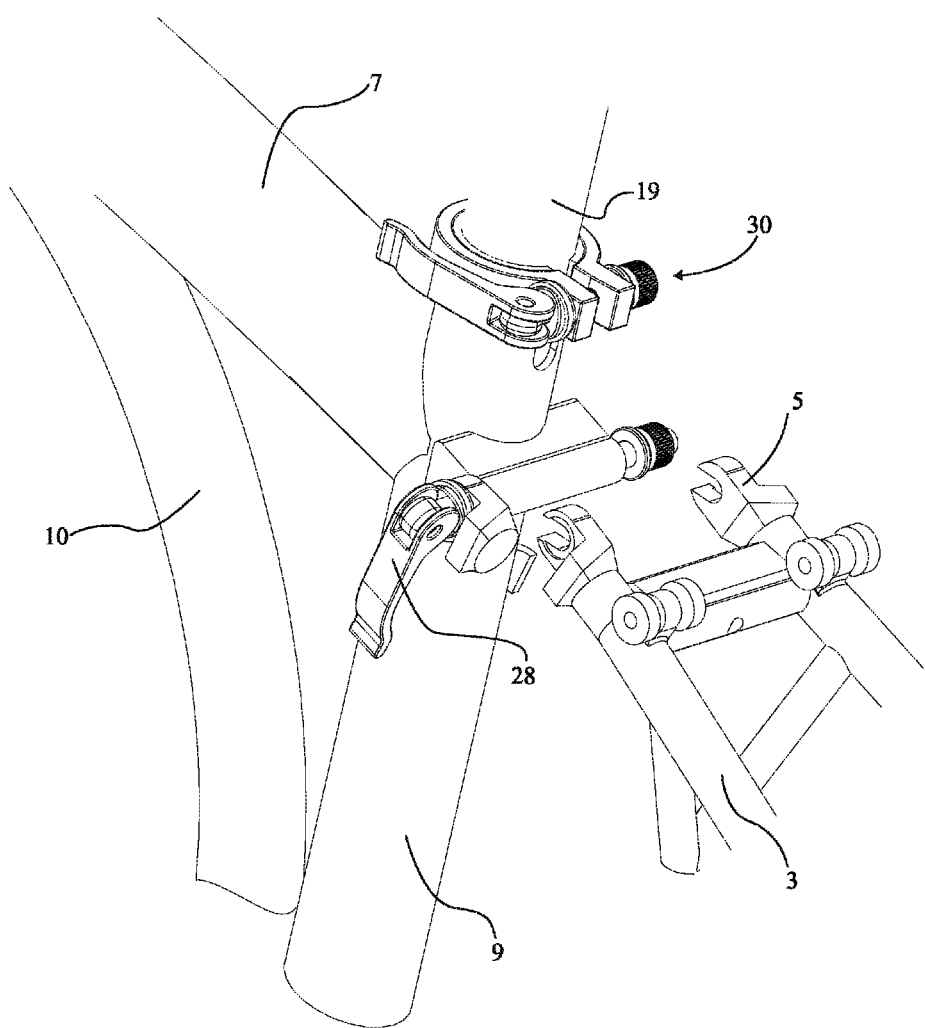
FIG. 8 is a perspective illustration of a quick-release clamp of the preferred embodiment of the present invention.
Figure 12:
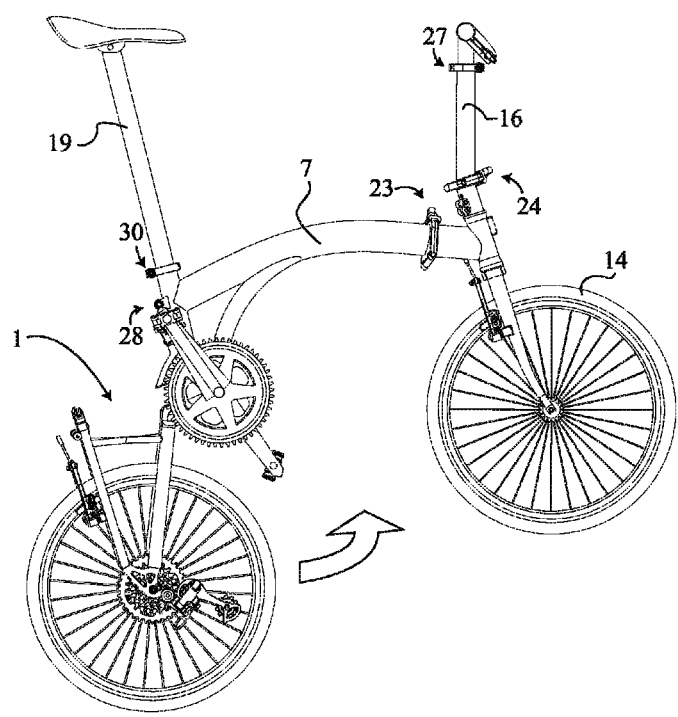
FIG. 12 is a right-side illustration showing a rear wheel assembly part way between a riding position and a folded position of the preferred embodiment of the present invention.
Figure 14:
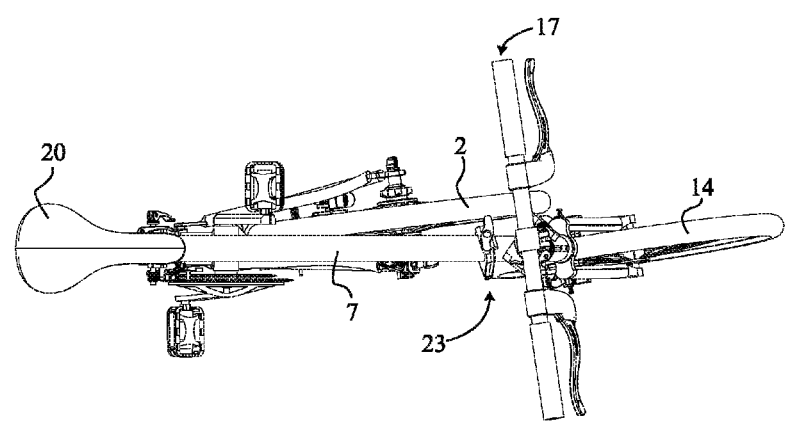
FIG. 14 is an alternative top-side illustration showing the rear wheel assembly in the folded position of the preferred embodiment of the present invention.
Figure 18:
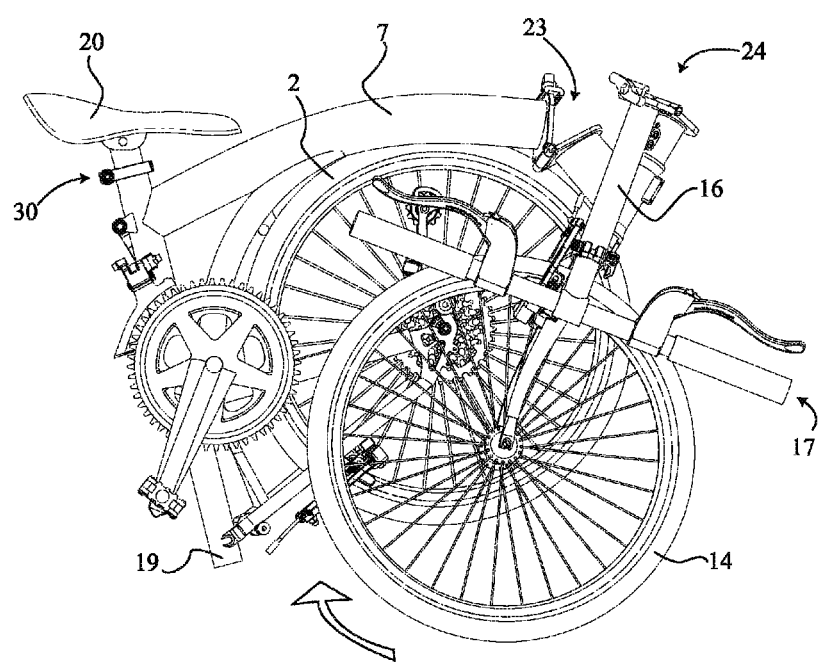
FIG. 18 is a right side illustration of the preferred embodiment of the present invention showing a fork and a front wheel part way between the use position and a folded position.
Figure 19:
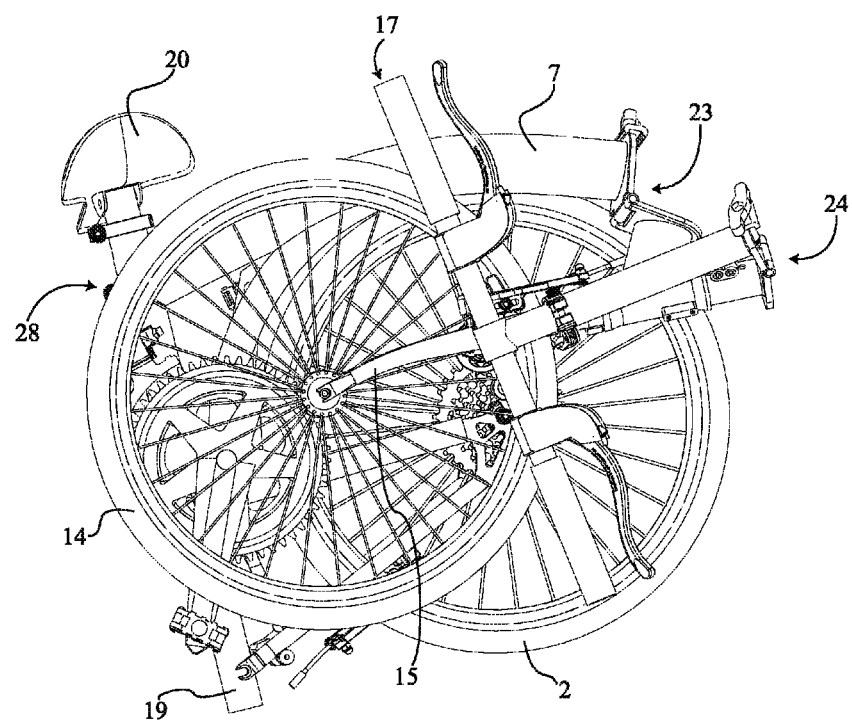
FIG. 19 is a right-side illustration of the preferred embodiment of the present invention showing the front wheel in a folded position.

1. Unfasten the seat stays clamp 28 located at the rear frame latch 5 to disengage the rear frame latch, as shown in FIG. 8.
2. Lift the rear end of the central frame assembly 6 up vertically by the seat post 19 and, with the aid of gravity, swing the rear wheel 2 about the pivot end downward then upward and forward, as shown in FIG. 12, until it lies alongside the main frame member 7 (as shown in FIG. 13 and FIG. 14).
3. Unfasten the seat post clamp 30 for the seat post 19 and, with the aid of gravity, retract the seat post 19 into the seat tube 9 until the seat 20 is proximal to the main frame member 7. Re-fasten the seat post clamp 30 to secure the seat post 19 in the retracted position (as shown in FIG. 15).
4. Unfasten the steering tube hinge 24 on the steering tube 16. With the aid of gravity, fold the handlebar 17 down to lie alongside the fork 15 and the front wheel 14 (as shown in FIG. 16 and FIG. 17). Secure the steering tube hinge 24 in the folded position.
5. Unfasten the main frame hinge 23 on the main frame member 7. Lift the front end of the main frame member 7 up and, with the aid of gravity, swing the front wheel 14 downward and then upward and rearward (as shown in FIG. 18), until it is brought to lie alongside the central frame assembly 6 in a plane approximately parallel to that of the folded rear wheel 2, but on the other side of the assembly (as shown in FIG. 19). Secure the main frame hinge 23 in the folded position.
6. The folded bicycle may also be rolled on its front wheel 14, as shown in FIG. 5, possibly by a suitably placed carrying handle for holding the bicycle.
7. Return of the bicycle to the riding position is achieved by reversing the folding action and re-securing all the hinge couplings and quick-release clamps. Both folding and unfolding of the bicycle are thus accomplished quickly and easily.

Although the invention has been explained in relation to its preferred embodiment, it is to be understood that many other possible modifications and variations can be made without departing from the spirit and scope of the invention as hereinafter claimed.

What is claimed is:
1. A folding bicycle comprising,
  a rear wheel assembly including a rear wheel, and a wheel carrier;
  a central frame assembly including a main frame member, a head tube, a seat tube, a down tube, and a bottom bracket;
  a steering assembly including a front wheel, a fork, a steering tube, a handlebar, and a handlebar stem;
  a seat assembly including a seat post and a seat;
  a main frame hinge;
  a rear wheel axle traversing through and perpendicular to the wheel carrier;
  the handlebar stem being connected to the steering tube;
  the seat being connected to the seat post;
  the seat post traversing through the seat tube;
  the main frame hinge comprising a hinge axis; and
  the main frame hinge interconnecting the main frame member and the head tube,
  wherein the head tube and the steering assembly can pivot in an inclined plane relative to the main frame member through approximately 90 degrees to a folded position by movement downward, then upward and backward, so that the front wheel may be brought to lie alongside the central frame assembly in a plane inclined at a first acute angle relative to the vertical longitudinal plane, and to overlap the main frame member in a side view of the bicycle when folded.
2. The folding bicycle as claimed in claim 1 comprises,
  a rear frame hinge and a rear frame latch;
  the rear frame hinge comprising a hinge axis;
  the rear frame hinge interconnecting the central frame assembly and the rear wheel assembly; and
  the rear wheel assembly being detachably coupled to the central frame assembly, wherein the rear wheel assembly can pivot relative to the central frame assembly through approximately 180 degrees in a vertical plane inclined at a first acute angle to a bicycle vertical plane, such that the rear wheel can swing progressively out of a bicycle vertical longitudinal plane to lie generally along one side of the main frame member opposite to the folded front wheel, and to overlap the main frame member in a side view of the bicycle when folded.
3. The folding bicycle as claimed in claim 2 comprises,
  a steering tube hinge;
  the steering tube hinge comprising a hinge axis;
  the steering tube hinge being positioned on the steering tube, wherein the steering tube and the handlebar can pivot about the steering tube hinge downward from an unfolded position to a folded position that lies alongside the fork and the front wheel.

4. The folding bicycle as claimed in claim 3, wherein the seat can be progressively lowered as the seat post is retracted into the seat tube from a riding position to a fully retracted position, such that the seat may be located proximal to the main frame member, with the seat post extending out from a bottom end of the seat tube in a region partially occupied by the wheel carrier and a rear drive system in a folded position, but without interference.

5. The folding bicycle as claimed in claim 4 comprises,
a seat stays clamp, a main frame clamp, a handlebar clamp, a steering tube clamp, and a seat post clamp;
the seat stays clamp securing the rear wheel assembly to the central frame assembly, wherein the seat stays clamp prevents pivotal motion of the rear frame hinge;
the main frame clamp locking the main frame hinge when fastened;
the handlebar clamp preventing the handlebar stem from sliding when fastened;
the steering tube clamp locking the steering tube hinge when fastened; and
the seat post clamp preventing the seat post from sliding when fastened.

6. The folding bicycle as claimed in claim 5,
wherein unfastening the seat stays clamp and lifting a rear end of the central frame assembly up vertically by the seat post will allow gravity to assist in folding the rear wheel assembly downward and forward relative to the central frame assembly;
wherein unfastening the seat post clamp will allow gravity to assist in retracting the seat post into the seat tube;
wherein unfastening the steering tube clamp will allow gravity to assist in folding the steering tube and handlebar downward;
wherein unfastening the main frame clamp and lifting the main frame member up vertically will allow gravity to assist in folding the steering assembly downward and rearward relative to the central frame assembly; and
wherein the folding bicycle can be rolled on the front wheel when the folding bicycle is in the folded position.

7. The folding bicycle as claimed in claim 3 comprises,
the hinge axis of the steering tube hinge being approximately perpendicular to an axis of the head tube and inclined at a fourth acute angle, wherein the fourth acute angle is relative to a plane of the front wheel.

8. The folding bicycle as claimed in claim 7,
the fourth acute angle being approximately 45 degrees, wherein the fourth acute angle is measured clockwise from a top view of the head tube.

9. The folding bicycle as claimed in claim 2 comprises,
an axis of the bottom bracket being transverse to the main frame member and parallel to the rear wheel axle when the folding bicycle is in an unfolded position; and
the hinge axis of the rear frame hinge being inclined at a first acute angle, wherein the first acute angle is relative to the axis of the bottom bracket.

10. The folding bicycle as claimed in claim 9,
the first acute angle being approximately 5 degrees, wherein the first acute angle is measured counter-clockwise from a top view of the folding bicycle.

11. The folding bicycle as claimed in claim 1 comprises,
the hinge axis of the main frame hinge being firstly inclined at a second acute angle and secondly inclined at a third acute angle wherein the second acute angle is relative to a transverse horizontal axis and the third acute angle is relative to a horizontal plane.

12. The folding bicycle as claimed in claim 11,
the second acute angle being approximately 15 degrees, wherein the second acute angle is measured counter-clockwise from a top view of the folding bicycle; and
the third acute angle being approximately 20 degrees, wherein the third acute angle is measured clockwise from a true front view of the main frame hinge.

13. A folding bicycle comprising,
a rear wheel assembly including a rear wheel, a wheel carrier, and a rear frame latch;
a central frame assembly including a main frame member, a head tube, a seat tube, a down tube, and a bottom bracket;
a steering assembly including a front wheel, a fork, a steering tube, a handlebar, and a handlebar stem;
a seat assembly including a seat post and a seat;
a main frame hinge, a rear frame hinge, and a steering tube hinge;
a rear wheel axle traversing through and perpendicular to the wheel carrier;
the handlebar stem being connected to the steering tube;
the seat being connected to the seat post;
the seat post traversing through the seat tube;
the main frame hinge, the rear frame hinge, and the steering tube hinge each comprising a hinge axis;
the rear frame hinge interconnecting the central frame assembly and the rear wheel assembly;
the main frame hinge interconnecting the main frame member and the head tube;
the steering tube hinge being positioned on the steering tube;
wherein the rear wheel assembly can pivot relative to the central frame assembly through approximately 180 degrees in a vertical plane inclined at a first acute angle to a bicycle vertical plane, such that the rear wheel can swing progressively out of a bicycle vertical longitudinal plane to lie generally along one side of the main frame member and to overlap the main frame member in a side view of the bicycle when folded;
wherein the head tube and the steering assembly can pivot in an inclined plane relative to the main frame member through approximately 90 degrees to a folded position by movement downward, then upward and backward, so that the front wheel may be brought to lie alongside the central frame assembly in a plane inclined relative to the vertical longitudinal plane and approximately parallel to a plane of the folded rear wheel, but lying on an opposite side of the main frame member;
wherein the steering tube and the handlebar can pivot about the steering tube hinge downward from an unfolded position to the folded position that lies alongside the fork and the front wheel; and
wherein the seat can be progressively lowered as the seat post is retracted into the seat tube from a riding position to a fully retracted position, such that the seat may be located proximal to the main frame member, with the seat post extending out from a bottom end of the seat tube in a region partially occupied by the wheel carrier and a rear drive system in the folded position, but without interference.

14. The folding bicycle as claimed in claim 13 comprises,
an axis of the bottom bracket being transverse to the main frame member and parallel to the rear wheel axle when the folding bicycle is in the unfolded position;
the hinge axis of the rear frame hinge being inclined at a first acute angle, wherein the first acute angle is relative to the axis of the bottom bracket; and the first acute angle being approximately 5 degrees, wherein the first acute angle is measured counter-clockwise from a top view of the folding bicycle.

15. The folding bicycle as claimed in claim 13 comprises,
the hinge axis of the main frame hinge being firstly inclined at a second acute angle and secondly inclined at a third acute angle wherein the second acute angle is relative to a transverse horizontal axis and the third acute angle is relative to a horizontal plane;
the second acute angle being approximately 15 degrees, wherein the second acute angle is measured counter-clockwise from a top view of the folding bicycle; and
the third acute angle being approximately 20 degrees, wherein the third acute angle is measured clockwise from a true front view of the main frame hinge.

16. The folding bicycle as claimed in claim 13 comprises,
the hinge axis of the steering tube hinge being approximately perpendicular to an axis of the head tube and inclined at a fourth acute angle, wherein the fourth acute angle is relative to a plane of the front wheel; and
the fourth acute angle being approximately 45 degrees, wherein the fourth acute angle is measured clockwise from a top view of the head tube.

17. The folding bicycle as claimed in claim 13 comprises,
the rear wheel assembly being detachably coupled to the central frame assembly;
a seat stays clamp, a seat post clamp, a main frame clamp, and a steering tube clamp;
the seat stays clamp securing the rear wheel assembly to the central frame assembly, wherein the seat stays clamp prevents pivotal motion of the rear frame hinge;
the seat post clamp preventing the seat post from sliding when fastened;
the main frame clamp locking the main frame hinge when fastened;
the handlebar clamp preventing the handlebar stem from sliding when fastened;
the steering tube clamp locking the steering tube hinge when fastened;
wherein unfastening the seat stays clamp and lifting a rear end of the central frame assembly up vertically by the seat post will allow gravity to assist in folding the rear wheel assembly downward and forward relative to the central frame assembly;
wherein unfastening the seat post clamp will allow gravity to assist in retracting the seat post into the seat tube;
wherein unfastening the steering tube clamp will allow gravity to assist in folding the steering tube and the handlebar downward;
wherein unfastening the main frame clamp and lifting the main frame member up vertically will allow gravity to assist in folding the steering assembly downward and rearward relative to the central frame assembly; and
wherein the folding bicycle can be rolled on the front wheel when the folding bicycle is in the folded position.

18. A folding bicycle comprises,
a rear wheel assembly including a rear wheel, a wheel carrier, and a rear frame latch;
a central frame assembly including a main frame member, a head tube, a seat tube, a down tube, and a bottom bracket;
a steering assembly including a front wheel, a fork, a steering tube, a handlebar, and a handlebar stem;
a seat assembly including a seat post and a seat;
a main frame hinge, a rear frame hinge, and a steering tube hinge;
a rear wheel axle traversing through and perpendicular to the wheel carrier;
a seat stays clamp, a seat post clamp, a main frame clamp, and a steering tube clamp;
an axis of the bottom bracket being transverse to the main frame member and parallel to the rear wheel axle when the folding bicycle is in the unfolded position;
the handlebar stem being connected to the steering tube;
the seat being connected to the seat post;
the seat post traversing through the seat tube;
the rear wheel assembly being detachably coupled to the central frame assembly;
the main frame hinge, the rear frame hinge, and the steering tube hinge each comprising a hinge axis;
the rear frame hinge interconnecting the central frame assembly and the rear wheel assembly;
the main frame hinge interconnecting the main frame member and the head tube;
the steering tube hinge being positioned on the steering tube;
the hinge axis of the rear frame hinge being inclined at a first acute angle, wherein the first acute angle is relative to the axis of the bottom bracket;
the hinge axis of the main frame hinge being firstly inclined at a second acute angle and secondly inclined at a third acute angle wherein the second acute angle is relative to a transverse horizontal axis and the third acute angle is relative to a horizontal plane;
the hinge axis of the steering tube hinge being approximately perpendicular to an axis of the head tube and inclined at a fourth acute angle, wherein the fourth acute angle is relative to a plane of the front wheel;
the seat stays clamp securing the rear wheel assembly to the central frame assembly, wherein the seat stays clamp prevents pivotal motion of the rear frame hinge;
the seat post clamp preventing the seat post from sliding when fastened;
the main frame clamp locking the main frame hinge when fastened;
the handlebar clamp preventing the handlebar stem from sliding when fastened;
the steering tube clamp locking the steering tube hinge when fastened;
wherein the rear wheel assembly can pivot relative to the central frame assembly through approximately 180 degrees in a vertical plane inclined at a first acute angle to a bicycle vertical plane, such that the rear wheel can swing progressively out of a bicycle vertical longitudinal plane to lie generally along one side of the main frame member and to overlap the main frame member in a side view of the bicycle when folded;
wherein the head tube and steering assembly can pivot in an inclined plane relative to the main frame member through approximately 90 degrees to a folded position by movement downward, then upward and backward, so that the front wheel may be brought to lie alongside the central frame assembly in a plane inclined relative to the vertical longitudinal plane and approximately parallel to a plane of the folded rear wheel, but lying on an opposite side of the main frame member;
wherein the steering tube and the handlebar can pivot about the steering tube hinge downward from the unfolded position to the folded position that lies alongside the fork and the front wheel; and
wherein the seat can be progressively lowered as the seat post is retracted into the seat tube from a riding position to a fully retracted position, such that the seat may be located proximal to the main frame member, with the seat post extending out from a bottom end of the seat tube in a region partially occupied by the wheel carrier and a rear drive system in the folded position, but without interference.

19. The folding bicycle as claimed in claim 18, the first acute angle being approximately 5 degrees, wherein the first acute angle is measured counter-clockwise from a top view of the folding bicycle;

the second acute angle being approximately 15 degrees, wherein the second acute angle is measured counter-clockwise from a top view of the folding bicycle;

the third acute angle being approximately 20 degrees, wherein the third acute angle is measured clockwise from a true front view of the main frame hinge;

the fourth acute angle being approximately 45 degrees, wherein the fourth acute angle is measured clockwise from a top view of the head tube;

wherein unfastening the seat stays clamp and lifting a rear end of the central frame assembly up vertically by the seat post will allow gravity to assist in folding the rear wheel assembly downward and forward relative to the central frame assembly;

wherein unfastening the seat post clamp will allow gravity to assist in retracting the seat post into the seat tube;

wherein unfastening the steering tube clamp will allow gravity to assist in folding the steering tube and the handlebar downward;

wherein unfastening the main frame clamp and lifting the main frame member up vertically will allow gravity to assist in folding the steering assembly downward and rearward relative to the central frame assembly; and wherein the folding bicycle can be rolled on the front wheel when the folding bicycle is in the folded position.

* * * * *